US012504327B2

United States Patent
Chen et al.

(10) Patent No.: US 12,504,327 B2
(45) Date of Patent: Dec. 23, 2025

(54) TEMPERATURE SENSOR DEVICE FOR POWER DISTRIBUTION PANEL

(71) Applicant: ORIENTAL SYSTEM TECHNOLOGY INC., Hsinchu (TW)

(72) Inventors: Chun-Chiang Chen, Zhubei (TW); Chein-Hsun Wang, Hsin-Chu (TW); Chen-Tang Huang, Zhubei (TW); Jenping Ku, Hsinchu County (TW)

(73) Assignee: ORIENTAL SYSTEM TECHNOLOGY INC., Hsinchu (TW)

( * ) Notice: Subject to any disclaimer, the term of this patent is extended or adjusted under 35 U.S.C. 154(b) by 428 days.

(21) Appl. No.: 18/308,416

(22) Filed: Apr. 27, 2023

(65) Prior Publication Data

US 2023/0349768 A1 Nov. 2, 2023

(30) Foreign Application Priority Data

Apr. 28, 2022 (TW) .................. 111204366

(51) Int. Cl.
*G01J 5/10* (2006.01)
*G08B 21/18* (2006.01)
*H04L 12/10* (2006.01)

(52) U.S. Cl.
CPC .............. *G01J 5/10* (2013.01); *G08B 21/182* (2013.01); *G01J 2005/106* (2013.01); *H04L 12/10* (2013.01)

(58) Field of Classification Search
CPC .... G01J 5/10; G01J 2005/106; G08B 21/182; H04L 12/10
See application file for complete search history.

(56) References Cited

U.S. PATENT DOCUMENTS 10,019,880 B1 * 7/2018 Winters .................... G08B 5/38
10,028,111 B2 * 7/2018 Ansari .................. A47G 29/121

FOREIGN PATENT DOCUMENTS

WO WO-2011116258 A1 * 9/2011 ............. H04L 12/10
WO WO-2021050624 A1 * 3/2021 ................ G01J 5/00

OTHER PUBLICATIONS

"What is Power Over Ethernet?" from Cisco Systems (Year: 2025).*

* cited by examiner

*Primary Examiner* — Randy W Gibson
(74) *Attorney, Agent, or Firm* — Muncy, Geissler, Olds & Lowe, P.C.

(57) ABSTRACT

A temperature sensor device for a power distribution panel includes a Power over Ethernet (PoE) interface, a DC-to-DC step down converter, at least one infrared temperature sensor array, a microcontroller and a communication interface. The PoE interface is used to obtain a required power supply from the Ethernet network. The DC-to-DC step down converter steps down the power supply from a first voltage to a second voltage. The infrared temperature sensor array receives infrared rays radiated from a monitored area of the power distribution panel and generates a corresponding sensation signal. The microcontroller receives the sensation signal and generates an alert signal when the sensed temperature of the monitored area exceeds a preset threshold. The threshold can be dynamically adjusted according to time of day or day of months. The communication interface enables the communication between an external electronic device and the temperature sensor device for the power distribution panel.

12 Claims, 2 Drawing Sheets

TEMPERATURE SENSOR DEVICE FOR POWER DISTRIBUTION PANEL

BACKGROUND OF THE INVENTION

1. Field of the Invention

The present invention relates to a temperature sensor, particularly to a temperature sensor device for a power distribution panel.

2. Description of the Prior Art

Over-heat may seriously damage a power distribution panel and related equipment. In most cases, malfunctions or fires of a power distribution panel result from loosening or heating up of contacts.

A conventional technology uses a contact thermometer disposed near the power strip to measure the temperatures of power cables and contacts. However, the technology is less accurate, and the insufficient response speed thereof impairs fire prevention. Besides, multipoint temperature monitoring of a power distribution panel needs a plurality of contact-type temperature transducers. A power distribution panel is hard to afford sufficient space for the installation of the contact-type temperature transducers themselves and the required wiring layout. Therefore, the application of contact-type temperature transducers is restricted in the field of monitoring the temperatures of power distribution panels.

Another conventional technology uses infrared sensor arrays to remotely detect the power strip and contacts. The conventional technology provides fast response. However, a power distribution panel is hard to afford sufficient space for the installation of the power source, the communication module interface and the wiring layout. Therefore, the conventional technology is also restricted in the field of monitoring the temperatures of power distribution panels.

Accordingly, it is the target for the manufacturers to provide a fully-integrated remote temperature sensor module to overcome the abovementioned problems.

SUMMARY OF THE INVENTION

The present invention provides a temperature sensor device for a power distribution panel. The temperature sensor device for a power distribution panel of the present invention is powered by a Power over Ethernet (PoE) interface and integrated with a communication interface to communicate with an external electronic device. The temperature sensor device of the present invention has advantages of smaller volume and easy installation. Therefore, the temperature sensor device of the present invention is suitable to be used in narrow space of a power distribution panel.

In one embodiment of the present invention, the temperature sensor device for a power distribution panel comprises a Power over Ethernet (PoE) interface, a DC to DC step down converter, at least one infrared temperature sensor array, a microcontroller, and a communication interface. The PoE interface is connected with an Ethernet network to obtain electric power. The DC to DC step down converter is electrically connected with the PoE interface, lowering a first voltage to a second voltage. At least one infrared temperature sensor array is pointed to a monitored area of a power distribution panel, receiving an infrared ray radiated by the monitored area and generating a corresponding sensation signal. The microcontroller is electrically connected with at least one infrared temperature sensor array, receiving and processing the sensation signals, and generating an alert signal while a sensed temperature of the monitored area exceeds a preset threshold. The communication interface is electrically connected with the microcontroller, allowing an external electronic device to communicate with the temperature sensor device for the power distribution panel through the communication interface.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENTS

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
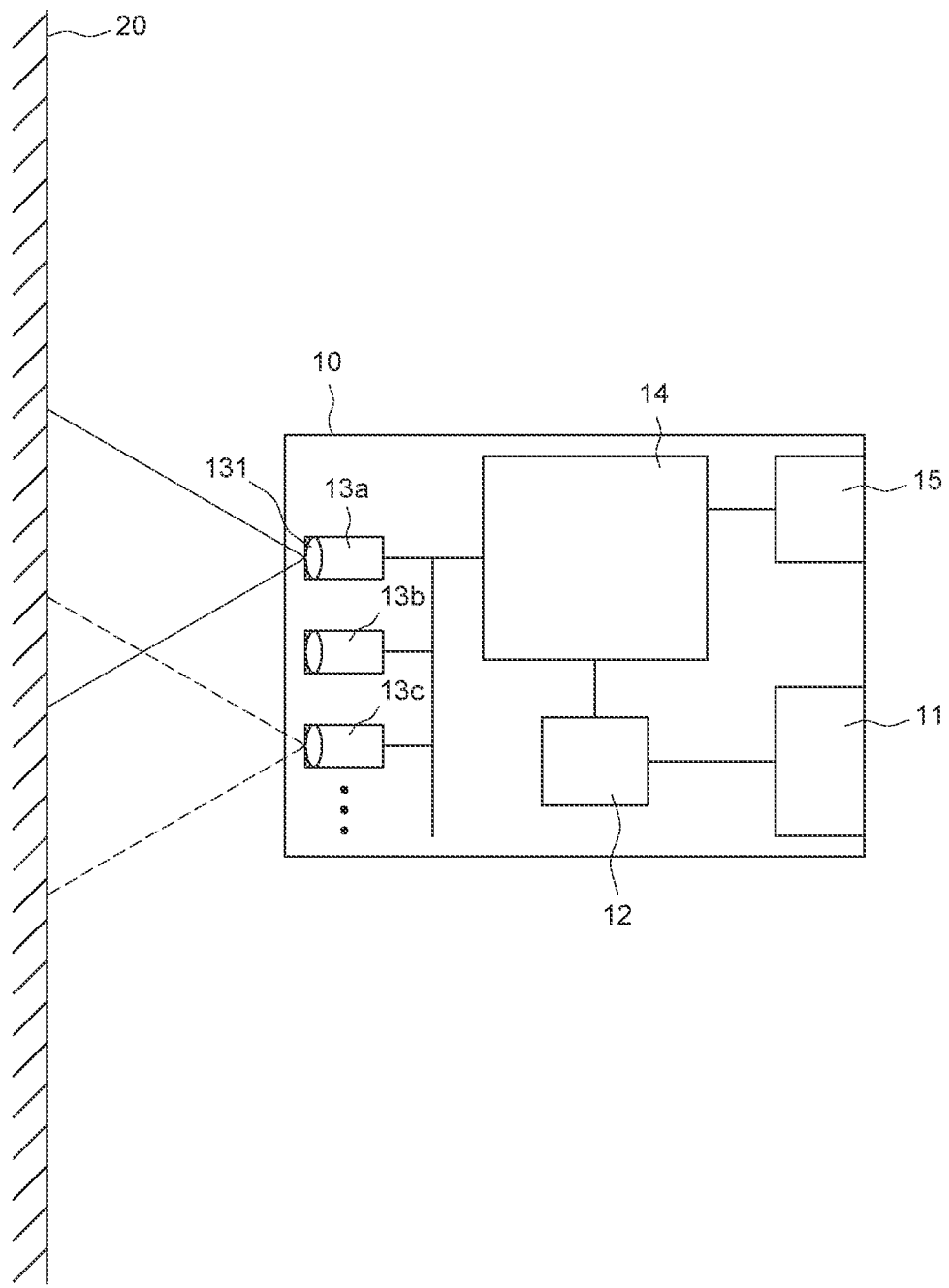
FIG. 1 is a diagram schematically showing a temperature sensor device for a power distribution panel according to one embodiment of the present invention.

Refer to FIG. 1. In one embodiment, the temperature sensor device 10 for a power distribution panel comprises a Power over Ethernet (PoE) interface 11, a DC to DC step down converter 12, at least one infrared temperature sensor array 13a, 13b or 13c, a microcontroller 14, and a communication interface 15. The PoE interface 11 may be connected with an Ethernet network, whereby the temperature sensor device 10 can obtain power from the PoE interface 11. The DC to DC step down converter 12 is electrically connected with the PoE interface 11, lowering a first voltage output by the PoE interface 11 to a second voltage. For example, the DC to DC step down converter 12 may lower the voltage from 48V to 5V to power the temperature sensor device 10 of the present invention.

At least one infrared temperature sensor array 13a, 13b or 13c is pointed to a monitored area (such as a power strip, a power cable or a contact) of a power distribution panel 20, receiving an infrared ray radiated by the monitored area and generating a corresponding sensation signal. In one embodiment, the infrared temperature sensor array 13a, 13b or 13c is a bolometer or a voltage-type thermopile array. In the embodiment shown in FIG. 1, the temperature sensor device 10 comprises a plurality of infrared temperature sensor arrays 13a, 13b and 13c. In one embodiment, each of the infrared temperature sensor arrays 13a, 13b and 13c includes a lens 131, which is used to define the detection angle of the infrared temperature sensor array 13a, 13b or 13c. In one embodiment, the detection angle of the infrared temperature sensor array 13a, 13b or 13c ranges from 30 to 110 degrees. In one embodiment, the lens 131 is made of a material allowing infrared light to pass. In one embodiment, the lens 131 is made of silicon or germanium, which allows the infrared light having wavelengths of 1-12 μm to pass. In one embodiment, the lens 131 is a silicon-based Fresnel lens.

The microcontroller 14 is electrically connected with the infrared temperature sensor array 13a, 13b or 13c. In one embodiment, the microcontroller 14 uses an Inter-Integrated Circuit Bus (I2C) to communicate with the infrared temperature sensor array 13a, 13b or 13c. The microcontroller 14 may receive and process the sensation signals output by the infrared temperature sensor array 13a, 13b or 13c. In one embodiment, the infrared temperature sensor array 13a, 13b or 13c is a 2-dimensional infrared temperature sensor array; the microcontroller 14 may process the sensation signals output by the infrared temperature sensor array 13a, 13b or 13c to form an infrared image. Thereby is acquired the sensed temperature of the monitored area of the power distribution panel 20. It is easily understood: while the sensed temperature of the monitored area exceeds a preset threshold, the microcontroller 14 would generate an alert signal. In one embodiment, the microcontroller 14 is an embedded microcontroller.

The communication interface 15 is electrically connected with the microcontroller 14. An external electronic device may communicate with the temperature sensor device 10 of the present invention through the communication interface 15. In one embodiment, the external electronic device reads the sensed temperature of the monitored area of the power distribution panel and the alert signal; alternatively, the microcontroller 14 transmits the alert signal to the external electronic device through the communication interface 15, for appropriate succeeding treatments, such as informing far-end users or interrupting power actively. In one embodiment, the communication interface 15 may be an Ethernet interface or an RS-485 (also called EIA-485) interface. It is easily understood: the Ethernet-based communication interface can be integrated with the PoE interface 11. In one embodiment, the microcontroller 14 adopts the MODBUS communication protocol according to the type of the communication interface 15. For an example, while the communication interface 15 is an Ethernet interface, the microcontroller 14 may use the MODBUS/TCP (Transmission Control Protocol) communication protocol to communication with the external electronic device according to the communication interface 15. For another example, while the communication interface 15 is an RS-485 interface, the microcontroller 14 may use the MODBUS/RTU (Remote Terminal Unit) communication protocol to communication with a remote terminal unit according to the communication interface 15.

Figure 2:
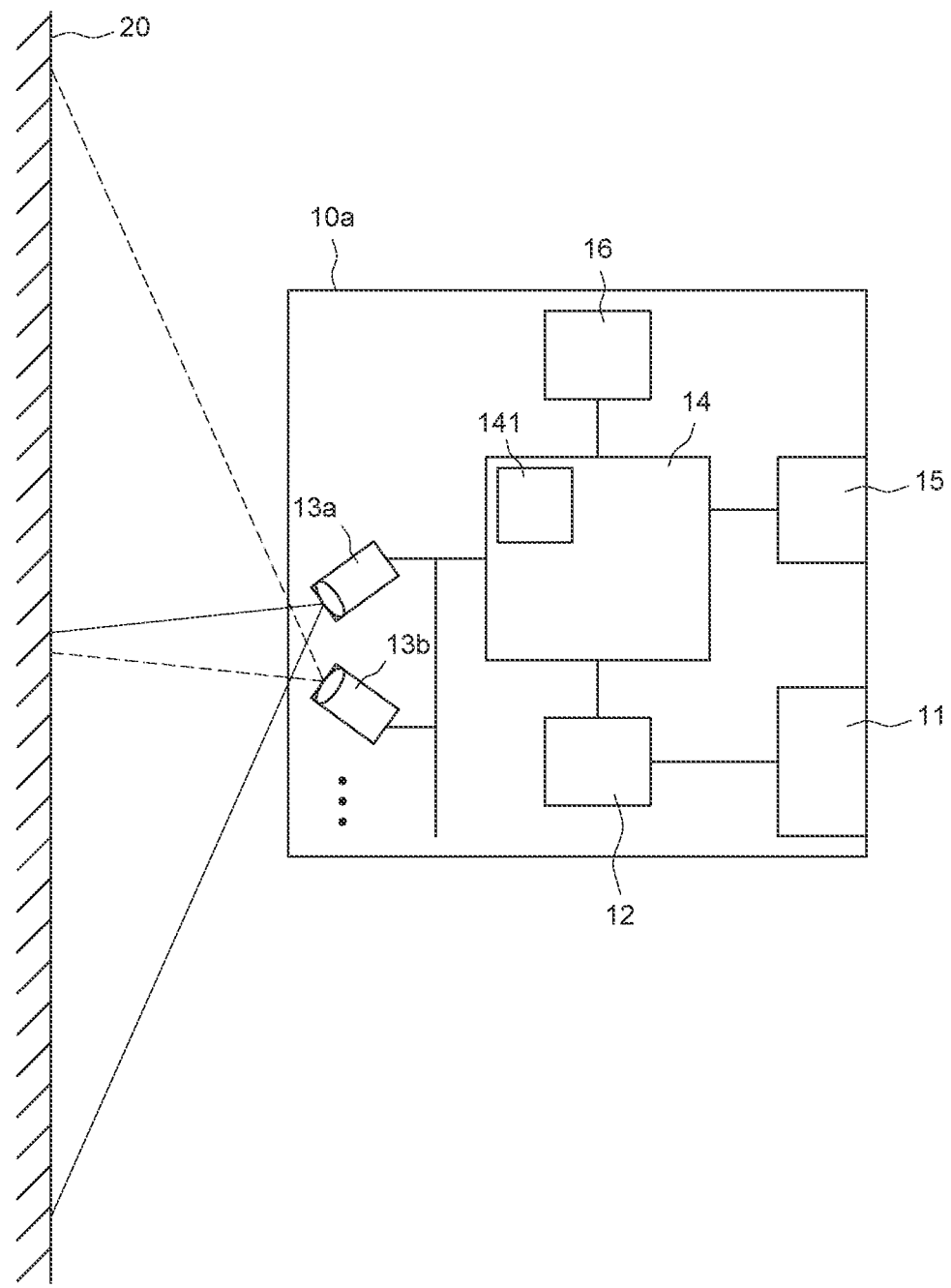
FIG. 2 is a diagram schematically showing a temperature sensor device for a power distribution panel according to another embodiment of the present invention.

In the embodiment shown in FIG. 1, the sensation directions of the infrared temperature sensor arrays 13a, 13b and 13c are vertically pointed to the plane where the monitored area of the power distribution panel 20 is located. It is easily understood: the interior space of the power distribution panel 20 is narrow. Even though the infrared temperature sensor arrays 13a, 13b and 13c having larger sensation angles are adopted, they cannot cover the monitored area yet. Refer to FIG. 2. In order to overcome the abovementioned problem, in one embodiment, the temperature sensor device 10a of the present invention includes one or more infrared temperature sensor arrays 13a and 13b, whose sensation directions are inclined by a tilt angle with respect to the plane where the monitored area of the power distribution panel 20 is located. In other words, the infrared temperature sensor arrays 13a and 13b are obliquely pointed to the monitored area of the power distribution panel 20, whereby to obtain a larger monitored area. In one embodiment, different infrared temperature sensor arrays 13a and 13b respectively monitor different areas.

It should be explained: the ambient temperature of the power distribution panel 20 varies with shift of day and night and transition of seasons. Suppose that the threshold is set to be a lower value. If the power distribution panel 20 experiences a higher ambient temperature (for example, it is around noon or in summer), the temperature detected by the infrared temperature sensor array may exceed the preset threshold, and thus a false action is triggered in a normal condition. Although setting the threshold set to be a higher value can overcome the abovementioned problem of false actions, it will spend more time to let the sensed temperature of the monitored area of the power distribution panel 20 exceed the threshold. Thus, the over-heat warning function may be affected. Refer to FIG. 2 again. Therefore, in one embodiment, the microcontroller 14 includes a real-time clock 141. The real-time clock 141 may undertake time synchronization with an external signal (such as a network signal or a time synchronization signal actively sent out by an external electronic device) through the communication interface 15. Thereby, the microcontroller 14 may record the background temperatures of specified time points according to the real time of the real-time clock 141. For example, the record of background temperatures may include the background temperatures of different time points of each day, the highest temperature of each day of different months, or the average of highest temperature in previous three days. In one embodiment, the background temperature may be the temperature actually detected in the environment or the temperature detected in the monitored area at a specified time point. Thus, the microcontroller 14 may dynamically modify the preset threshold according to the historical record of the background temperatures measured at specified time points plus an increment of temperature. The increment of temperature for threshold might be time of day or seasonal dependent to minimize false alarm rate. For an example, the microcontroller 14 may set the threshold to a higher temperature around noon or in summer lest higher ambient temperature causes false actions. For another example, the microcontroller 14 may set the threshold to a lower temperature in early morning or in winter so as to achieve better warning effect. In one embodiment, the preset threshold may be the background temperature plus an increment of temperature.

Refer to FIG. 2 again. In one embodiment, the temperature sensor device 10a of the present invention further comprises a register 16. The register 16 is electrically connected with the microcontroller 14, storing the sensed temperatures of the monitored areas, the historical record of background temperatures, and the preset thresholds corresponding to different time intervals. In one embodiment, the microcontroller 14 realizes a server that operates according to the MODBUS communication protocol, whereby the external electronic device can poll the temperature sensor device 10a of the present invention and read the sensed temperatures stored in the register 16. In one embodiment, the register 16 is integrated with the microcontroller 14.

In conclusion, the temperature sensor device for a power distribution panel of the present invention is powered by a PoE interface and integrated with a communication interface to communicate with an external electronic device. Therefore, the temperature sensor device of the present invention has advantages of smaller volume and easy installation and is suitable to be used in narrow space of a power distribution panel. In one embodiment, the temperature sensor device of the present invention can record and learn from the background temperatures of different time intervals, whereby to dynamically modify the preset threshold to avoid false actions and keep the over-heat warning function with lowest false alarm rate.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the appended claims.

What is claimed is:

1. A temperature sensor device for a power distribution panel, comprising
   a Power over Ethernet (POE) interface, connected with an Ethernet network to acquire electric power;
   a DC to DC step down converter, electrically connected with the PoE interface, and lowering a first voltage output by the PoE interface to a second voltage;
   at least one infrared temperature sensor array, pointed to a monitored area of a power distribution panel, receiving an infrared ray radiated by the monitored area and generating a corresponding sensation signal;
   a microcontroller, electrically connected with the at least one infrared temperature sensor array, receiving and processing the sensation signal, recording a background temperature at a specified time point and dynamically modifies the preset threshold according to the background temperature; and generating an alert signal while a sensed temperature of the monitored area exceeds a preset threshold; and
   a communication interface, electrically connected with the microcontroller, wherein an external electronic device communicates with the temperature sensor device for the power distribution panel through the communication interface.

2. The temperature sensor device for a power distribution panel according to claim 1, wherein the microcontroller is an embedded microcontroller.

3. The temperature sensor device for a power distribution panel according to claim 1, wherein the microcontroller includes a real-time clock, which can synchronize with an external signal through the communication interface.

4. The temperature sensor device for a power distribution panel according to claim 1, wherein the microcontroller uses an Inter-Integrated Circuit Bus (I2C) to communicate with the at least one infrared temperature sensor array.

5. The temperature sensor device for a power distribution panel according to claim 1, wherein the preset threshold might be based on background temperature of the day plus an increment of temperature, or be based on the average of highest background temperature of previous three days plus an increment of temperature, therefore the preset threshold is dynamically adjust according to time of day or seasonal day of months.

6. The temperature sensor device for a power distribution panel according to claim 5, wherein the increment of temperature for threshold might be time of day or seasonal dependent to minimize false alarm rate.

7. The temperature sensor device for a power distribution panel according to claim 1, wherein a sensation direction of the infrared temperature sensor array is inclined by a tilt angle with respect to a plane where the monitored area of the power distribution pane is located.

8. The temperature sensor device for a power distribution panel according to claim 1, which comprises a plurality of infrared temperature sensor arrays, wherein a sensation direction of each of the infrared temperature sensor arrays is inclined by a tilt angle with respect to a plane where the monitored area of the power distribution pane is located.

9. The temperature sensor device for a power distribution panel according to claim 1, wherein the infrared temperature sensor array includes a lens, which is used to define a detection angle of the infrared temperature sensor array; the detection angle of the infrared temperature sensor array ranges from 30 to 110 degrees.

10. The temperature sensor device for a power distribution panel according to claim 1, wherein the communication interface is an Ethernet interface or an RS-485 (also called EIA-485) interface.

11. The temperature sensor device for a power distribution panel according to claim 1, wherein the microcontroller realizes a MODBUS communication protocol in the communication interface.

12. The temperature sensor device for a power distribution panel according to claim 1 further comprising
    a register, electrically connected with the microcontroller, storing the sensed temperatures of the monitored areas, and realizing a server operating according to a MODBUS communication protocol to allow the external electronic device to poll the temperature sensor device and read the sensed temperatures.

* * * * *